(12) United States Patent  
Laaksonen et al.

(10) Patent No.: US 8,429,114 B2  
(45) Date of Patent: Apr. 23, 2013

(54) METHOD AND APPARATUS FOR PROVIDING LOW COST PROGRAMMABLE PATTERN RECOGNITION

(75) Inventors: Mika H. Laaksonen, Oulu (FI); Vesa Koivuaho, Oulu (FI)

(73) Assignee: Nokia Corporation, Espoo (FI)

( * ) Notice: Subject to any disclaimer, the term of this patent is extended or adjusted under 35 U.S.C. 154(b) by 405 days.

(21) Appl. No.: 12/893,559

(22) Filed: Sep. 29, 2010

(65) Prior Publication Data

US 2012/0078839 A1 Mar. 29, 2012

(51) Int. Cl.
*G06N 5/00* (2006.01)
(52) U.S. Cl.
USPC .............................................. 706/54; 706/45
(58) Field of Classification Search .................... 706/54, 706/45
See application file for complete search history.

(56) References Cited

U.S. PATENT DOCUMENTS

| | | | |
|---|---|---|---|
| 6,839,013 | B1 | 1/2005 | Cummins et al. |
| 7,768,245 | B1 | 8/2010 | De Cremoux |
| 2007/0174416 | A1 | 7/2007 | Waters et al. |
| 2008/0222444 | A1 | 9/2008 | Olofsson et al. |

FOREIGN PATENT DOCUMENTS

WO   WO 2009/131539 A1   10/2009

OTHER PUBLICATIONS

Beck, Manufacturing Mechatronics Using a Recursive Mask and Deposit (MD) Process, Master's Project Report, Carnegie Mellon, Department of Electrical and Computer Engineering, 1994, pp. 1-28.*
Albu, Diana; "On-node processing: Algorithms for Activity Classification and Monitoring in Wireless Sensor Networks" Master'sThesis; Technische Universiteit Eindhoven; Eindhoven, The Netherlands; 2009; 106 pages.
Benbasat, Ari Yosef; "An Automated Framework for Power-Efficient Detection in Embedded Sensor Systems"; Massachusetts Institute of Technology; 2007; 200 pages.
Brockman, Jay, et al.; "Memory-Based Structured Application Specific Integrated Circuit (ASIC) Study"; University of Notre Dame; Oct. 2008; 58 pages.
Delaval, Gwenaël, et al.; "A doman-specific language for task handlers generation, applying discrete controller synthesis"; Proceedings of the 2006 ACM Symposium on Applied Computing; Apr. 2006; ACM Press; New York, NY; 5 pages.
Ince, Nuri Firat, et al.; "Detection of Early Morning Daily Activities with Static Home and Wearable Wireless Sensors"; Research Article; EURASIP Journal on Advances in Signal Processing; vol. 2008; Hindawi Publishing Corporation; New York, NY; 11 pages.

(Continued)

*Primary Examiner* — Wilbert L Starks
(74) *Attorney, Agent, or Firm* — Alston & Bird LLP

(57) ABSTRACT

An apparatus for providing pattern recognition may include at least one processor and at least one memory including computer program code. The at least one memory and the computer program code may be configured to, with the at least one processor, cause the apparatus to at least receive an indication of sensor data descriptive of movement of a user terminal, provide for expansion of the sensor data in a predetermined manner to define outcome values, apply a logical mask to the outcome values to generate selected outcome values for provision to a finite state machine, and utilize a pattern recognition algorithm associated with the finite state machine to determine whether the sensor data corresponds to a pattern identified by proceeding through defined transitions to a final state of the finite state machine. A corresponding computer program product and method are also provided.

20 Claims, 9 Drawing Sheets

OTHER PUBLICATIONS

Kim, Jonghwa, et al.; "Bi-channel Sensor Fusion for Automatic Sign Language Recognition"; 8th IEEE International Conference on Automatic Face & Gesture Recognition; Sep. 2008; Amsterdam, The Netherlands; 6 pages.

Niezen, Gerrit; "The Optimization of Gesture Recognition Techniques for Resource-Constrained Devices"; University of Pretoria; Pretoria; South Africa; Apr. 2008; 83 pages.

Nisbet, Andy, et al.; "A systems architecture for sensor networks based on hardware/software co-design"; Proceedings of the 1st International IFIP Workshop on Autonomic Communications; Berlin, German; 2004; 12 pages.

Welsh, Matt; "Fiji: A Macroprogramming Framework for Data-Intensive Sensor Network Applications"; Harvard University; School of Engineering and Applied Sciences; 2007.

Westeyn, Tracy, et al.; "Georgia Tech Gesture Toolkit: Supporting Experiments in Gesture Recognition"; Proceedings of the 5th international conference on Multimodal interfaces; Vancouver, B.C., Canada; Nov. 2003; pp. 85-92.

International Search Report and Written Opinion for International Application No. PCT/IB2011/054302, mailed Mar. 1, 2012.

* cited by examiner

METHOD AND APPARATUS FOR PROVIDING LOW COST PROGRAMMABLE PATTERN RECOGNITION

TECHNOLOGICAL FIELD

Embodiments of the present invention relate generally to mobile electronic device technology and, more particularly, relate to a method and apparatus for providing low cost programmable pattern recognition.

BACKGROUND

Electronic devices are becoming increasingly ubiquitous in the modern world. In particular, mobile communication devices seem to be popular with people of all ages, socio-economic backgrounds and sophistication levels. Accordingly, users of such devices are becoming increasingly attached to their respective mobile communication devices. Whether such devices are used for calling, emailing, sharing or consuming media content, gaming, navigation or various other activities, people are more connected to their devices and consequently more connected to each other and to the world at large.

Due to advances in processing power, memory management, application development, power management and other areas, communication devices, such as computers, mobile telephones, cameras, personal digital assistants (PDAs), media players and many others are becoming more capable. However, the popularity and utility of mobile communication devices has not only fueled sales and usage of such devices in general, but has also caused continued competition by designers and manufacturers to provide more capable hardware in smaller packages with lower cost, and to provide vast numbers and kinds of applications that can be utilized on such devices.

BRIEF SUMMARY

A method, apparatus and computer program product are therefore provided to enable the provision of a pattern recognition system that may be useable on a mobile electronic device while providing a robust capability for pattern recognition in a very small package. Accordingly, for example, detection programs may be defined via a finite state machine that may be employed along with the sensor hardware or even on the same chip on which the sensor is located. Moreover, the detection programs may be relatively small making for a very robust detection capability with relatively low cost and low power consumption.

In one example embodiment, a method of providing pattern recognition is provided. The method may include receiving an indication of sensor data descriptive of movement of a user terminal, providing for expansion of the sensor data in a predetermined manner to define outcome values, applying a logical mask to the outcome values to generate selected outcome values for provision to a finite state machine, and utilizing a pattern recognition algorithm associated with the finite state machine to determine whether the sensor data corresponds to a pattern identified by proceeding through defined transitions to a final state of the finite state machine.

In another example embodiment, a computer program product for providing pattern recognition is provided. The computer program product includes at least one non-transitory computer-readable storage medium having computer-executable program code instructions stored therein. The computer-executable program code instructions may include program code instructions receive an indication of sensor data descriptive of movement of a user terminal, provide for expansion of the sensor data in a predetermined manner to define outcome values, apply a logical mask to the outcome values to generate selected outcome values for provision to a finite state machine, and utilize a pattern recognition algorithm associated with the finite state machine to determine whether the sensor data corresponds to a pattern identified by proceeding through defined transitions to a final state of the finite state machine.

In another example embodiment, an apparatus for providing pattern recognition is provided. The apparatus may include at least one processor and at least one memory including computer program code. The at least one memory and the computer program code may be configured to, with the at least one processor, cause the apparatus to at least receive an indication of sensor data descriptive of movement of the apparatus, provide for expansion of the sensor data in a predetermined manner to define outcome values, apply a logical mask to the outcome values to generate selected outcome values for provision to a finite state machine, and utilize a pattern recognition algorithm associated with the finite state machine to determine whether the sensor data corresponds to a pattern identified by proceeding through defined transitions to a final state of the finite state machine.

In another example embodiment, an apparatus for providing pattern recognition is provided. The apparatus may include means for receiving an indication of sensor data descriptive of movement of the apparatus, means for providing for expansion of the sensor data in a predetermined manner to define outcome values, means for apply a logical mask to the outcome values to generate selected outcome values for provision to a finite state machine, and means for utilize a pattern recognition algorithm associated with the finite state machine to determine whether the sensor data corresponds to a pattern identified by proceeding through defined transitions to a final state of the finite state machine.

BRIEF DESCRIPTION OF THE DRAWING(S)

Having thus described embodiments of the invention in general terms, reference will now be made to the accompanying drawings, which are not necessarily drawn to scale, and wherein:

Figure 6B:
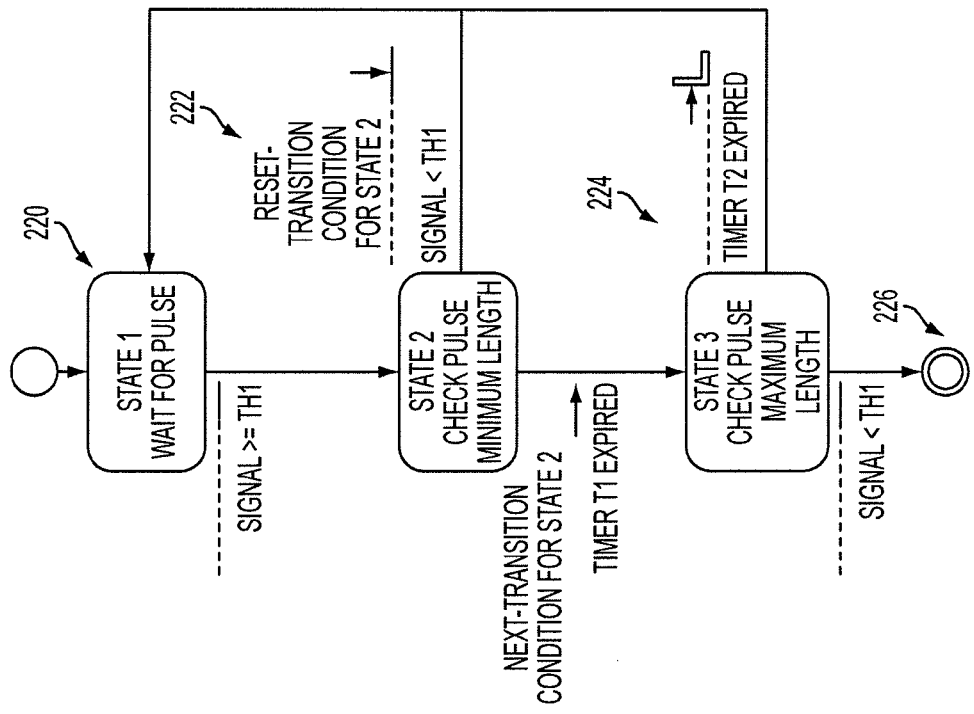
Figure 6A:
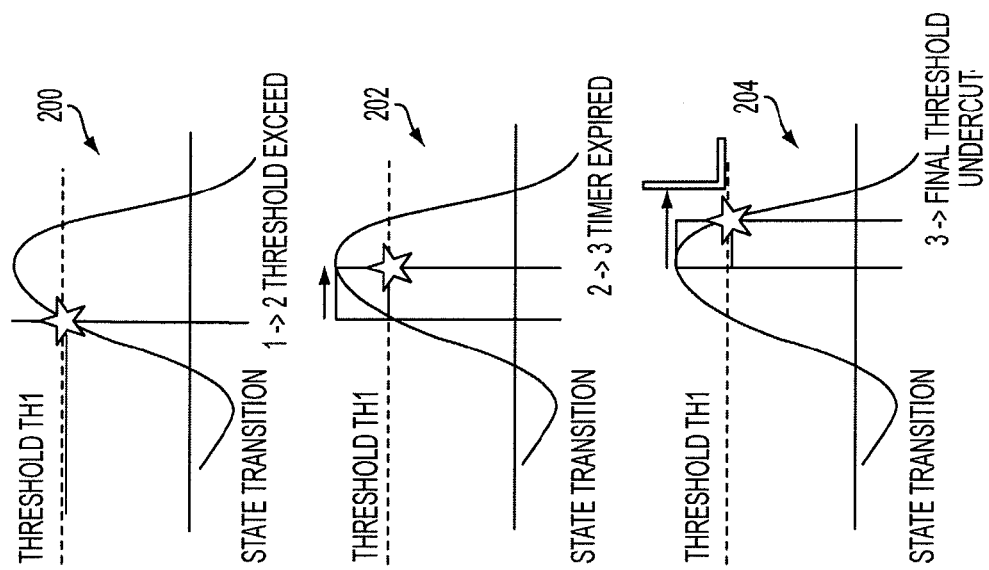
Figure 6C:
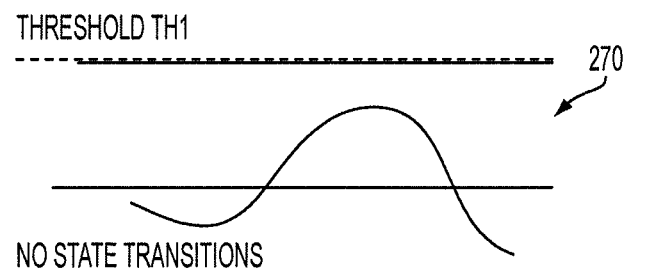
Figure 6C:
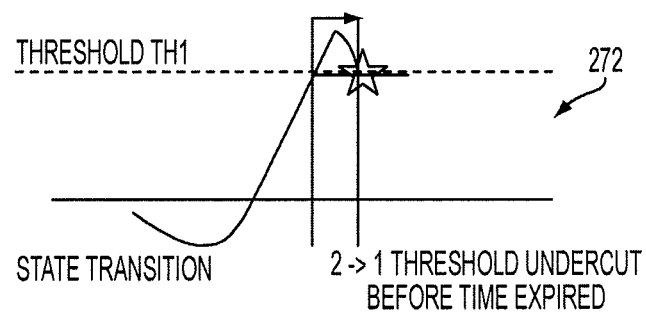
Figure 6C:
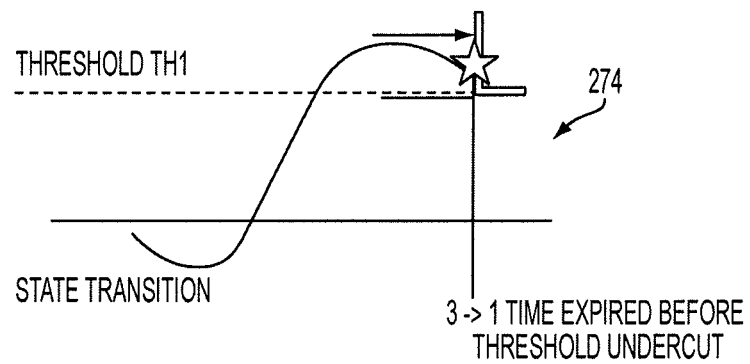
Figures 7, 8:
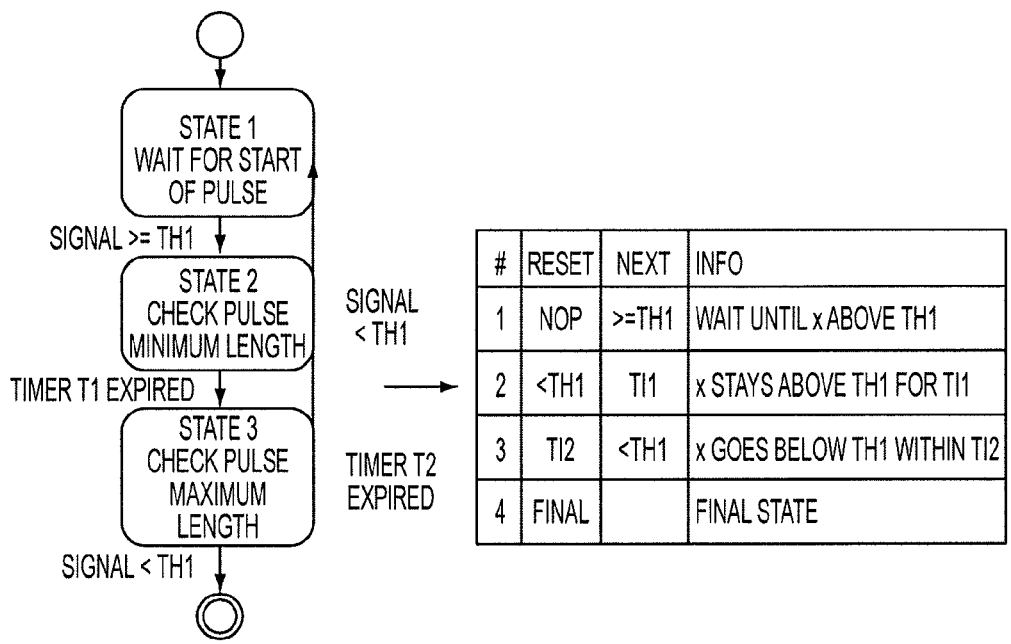
Figure 9:
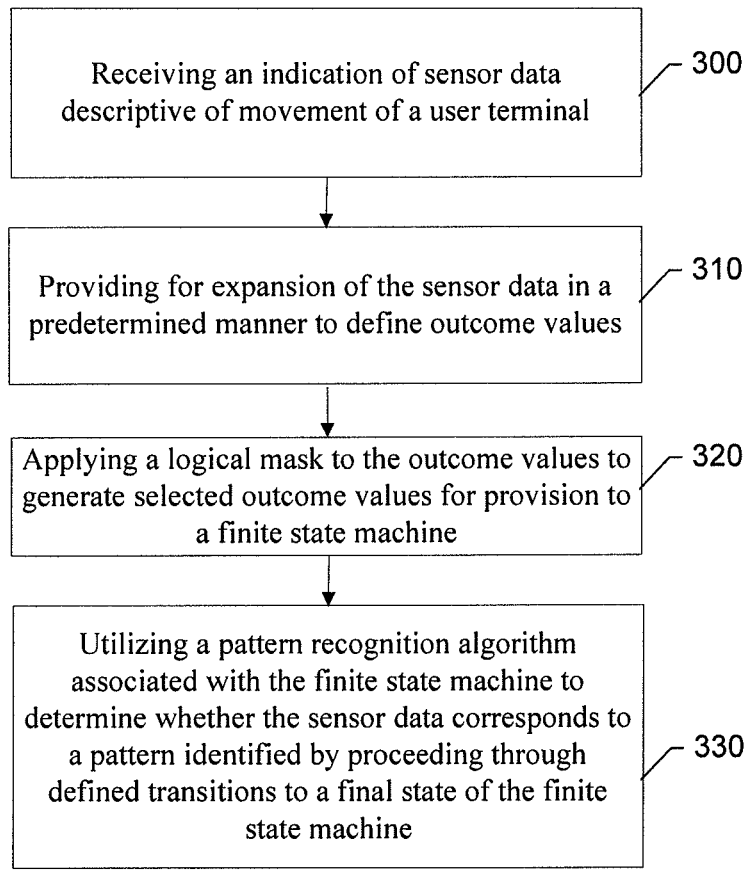

FIG. 6, which includes FIGS. 6A, 6B and 6C, illustrates an example of detection signals being evaluated using a finite state machine according to an exemplary embodiment of the present invention;

FIG. 7 shows example state chart of a signal detection algorithm corresponding to the example described in FIG. 6;

FIG. 8 illustrates an example of the conversion of the mnemonic codes of FIG. 7 into machine code of a domain specific processor according to an example embodiment of the present invention; and FIG. 9 is a flowchart according to a method for providing pattern recognition according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Mobile electronic devices such as cellular phones and other personal computing and/or communication devices are becoming very robust in their ability to interact with users and with other devices or networks. Such devices are often provided with very capable processors and peripheral devices that are aimed at improving the user experience. As an example, some mobile electronic devices are equipped with accelerometers or other sensor that may be configured to detect movement of a mobile electronic device and use such movement as a user interface mechanism. For example, a user holding the mobile electronic device in hand may be enabled to perform a particular gesture with the mobile electronic device as an input in order to cause a particular response.

When sensors are employed in this manner, the sensors may produce sensor data that is processed by a processing engine or even the main controller or processor of the mobile electronic device. However, such mechanisms often consume large amounts of energy since, for example, the processing engine may typically consume one-hundred to even one-thousand times the more energy than the sensor hardware. To avoid such a large consumption of energy, one alternative solution may be to employ a relatively low cost microcontroller dedicated to sensor data processing. However, size constraints may make it difficult to find room for such an additional processor and the cost of an additional separate processor may not be desirable in some cases.

Some embodiments of the present invention may enable the provision of a very small package (e.g., thirty-two bytes including sixteen bytes for a program and sixteen bytes for configuration and output) that can handle relatively robust pattern recognition. Accordingly, pattern recognition may be provided in a less costly manner in terms of monetary and space costs. As such, some embodiments may provide a small footprint, domain specific, low power consuming, processing device with a corresponding small memory that are used to employ, for example, a domain specific machine language included as a part of the sensor hardware for pattern recognition. Accordingly, a relatively low cost and efficient solution for providing pattern recognition capability in mobile electronic devices may be realized.

Figure 1:
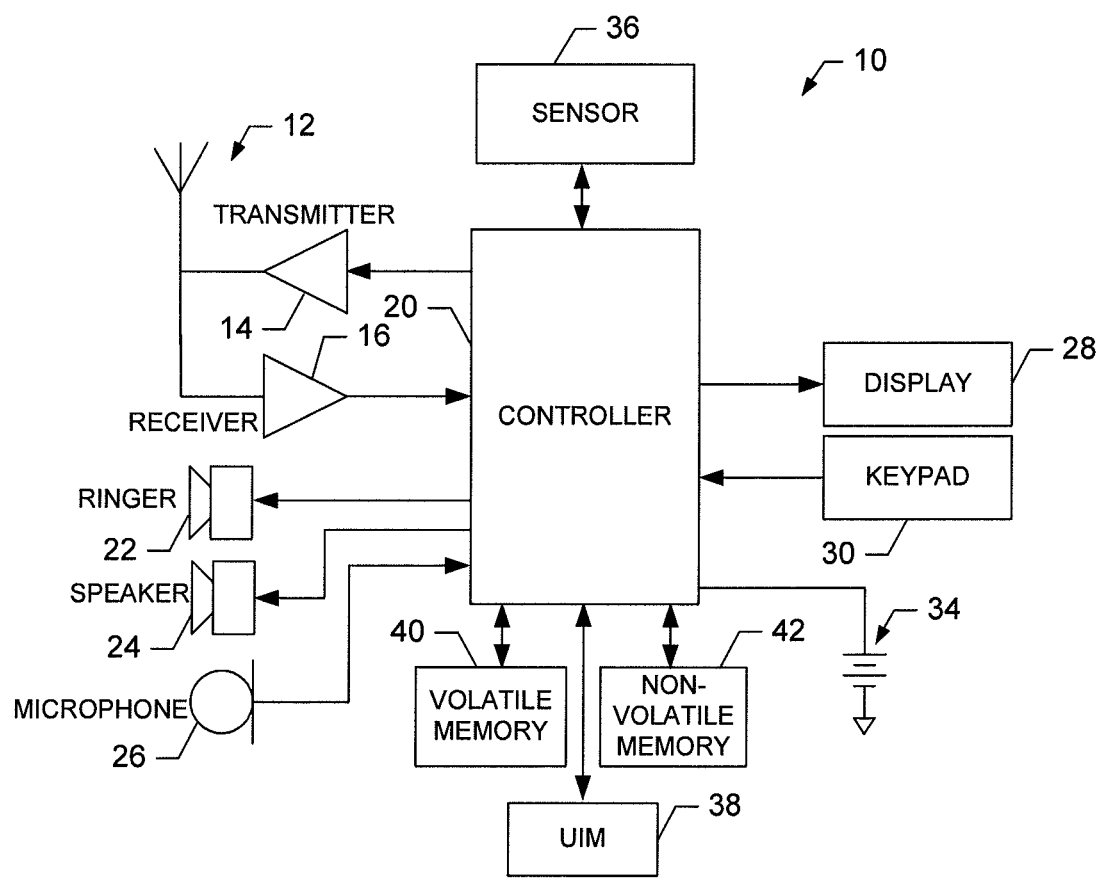
FIG. 1 is a schematic block diagram of a mobile terminal that may employ an example embodiment of the present invention.

FIG. 1, one example platform on which an example embodiment may be practiced, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, numerous types of mobile terminals, such as portable digital assistants (PDAs), mobile telephones, pagers, mobile televisions, gaming devices, laptop computers, cameras, video recorders, audio/video players, radios, positioning devices, e.g., global positioning system (GPS) devices, or any combination of the aforementioned, and other types of voice and text communications systems, may readily employ embodiments of the present invention.

The mobile terminal 10 may include an antenna 12, or multiple antennas, in operable communication with a transmitter 14 and a receiver 16. The mobile terminal 10 may further include an apparatus, such as a controller 20 or other processing device, which provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136, time division multiple access (TDMA), global system for mobile communication (GSM), and IS-95 code division multiple access (CDMA), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative, or additionally, the mobile terminal 10 may be capable of operating in accordance with non-cellular communication mechanisms. For example, the mobile terminal 10 may be capable of communication in a wireless local area network (WLAN) or other communication networks described below in connection with FIG. 2.

In some embodiments, the controller 20 may include circuitry desirable for implementing audio and logic functions of the mobile terminal 10. For example, the controller 20 comprises one or more digital signal processors and/or one or more microprocessors. The controller may further comprise one or more analog to digital converters, one or more digital to analog converters and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In addition, the mobile terminal 10 may include a sensor 36 such as, for example, a positioning or movement sensor. The sensor 36 may include, for example, an accelerometer, an inertial sensor, or other device capable of determining movement of the mobile terminal 10 relative to some reference. In some embodiments, the sensor 36 may include hardware for supporting functionality of the sensor 36 including an on-board processor and memory for storing instructions that, when executed by the on-board processor, configure the sensor 36 to perform corresponding functionality defined by the instructions. In some cases, however, the sensor 36 may utilize other processing resources of the mobile terminal 10 (e.g., the controller 20 or another processor). In some cases, the sensor 36 may include micro-electro-mechanical systems (MEMS) components and/or piezoelectric, piezoresistive, capacitive or other hardware components that may be used to convert mechanical motion into an electrical signal for sensing motion of the mobile terminal 10 and providing electrical signals responsive to, proportional to or otherwise based on the motion of the mobile terminal 10 (or more specifically the motion of the sensor 36). As used herein, movement of the sensor 36 refers to acceleration of the sensor 36 (or the apparatus in/on which the sensor 36 is located or housed), angular speed, and/or proximity information. The movement of the sensor 36 may therefore be measured, for example, by a MEMS type structure for acceleration, by a gyroscope for angular speed, or by a proximity sensor for proximity information. As such, movement of the sensor 36 typically involves a magnitude of speed or acceleration and a corresponding direction or orientation. In some cases, the movement measured may be multi-dimensional (e.g., having components of speed and/or acceleration in more than one dimension). However, movement in a single dimension is also contemplated and measurable in some example embodiments.

In some embodiments, the mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, e.g., cell id identity or cell id information, with which the mobile terminal 10 is in communication.

Figure 2:
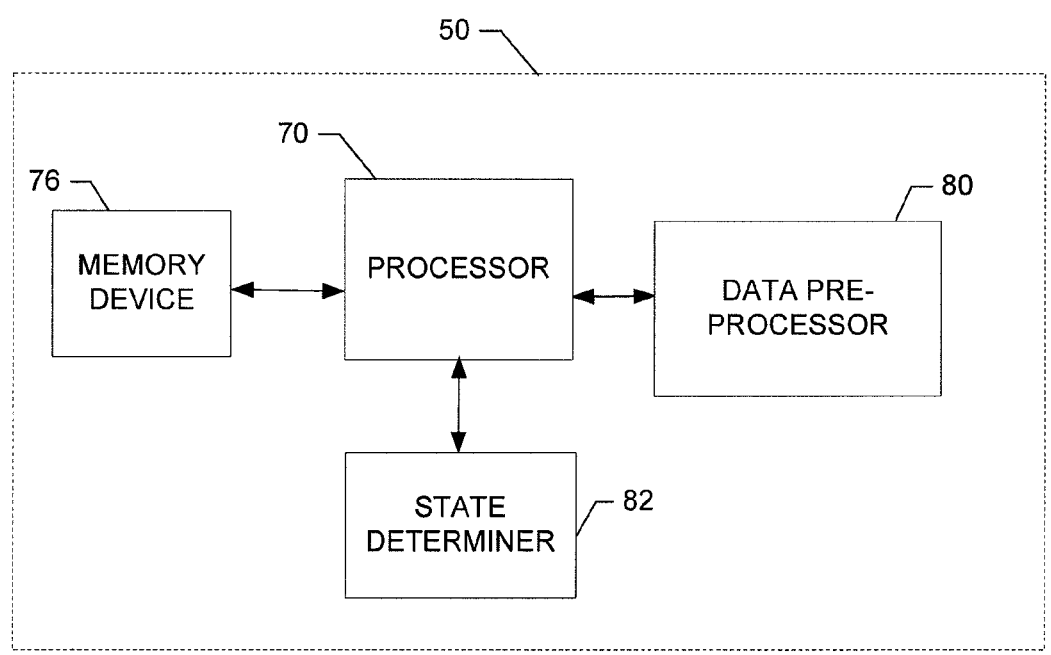
FIG. 2 is a schematic block diagram of an apparatus for providing a low cost and low power programmable recognition system according to an example embodiment of the present invention.

FIG. 2 is a schematic block diagram of an apparatus 50 for providing a low cost and low power programmable recognition system. The apparatus 50 may include or otherwise be in communication with one or more processors such as processor 70 and a memory device 76. The memory device 76 may include, for example, one or more volatile and/or non-volatile memories. In other words, for example, the memory device 76 may be an electronic storage device, e.g., a computer readable storage medium, comprising gates configured to store data that may be retrievable by a machine, e.g., a computing device. The memory device 76 may be configured to store information, data, applications, instructions or the like for enabling the apparatus to carry out various functions in accordance with exemplary embodiments of the present invention. For example, the memory device 76 may be configured to buffer input data for processing by the processor 70. Additionally or alternatively, the memory device 76 could be configured to store instructions for execution by the processor 70.

The apparatus 50 may, in some embodiments, be associated with sensor hardware (e.g., the sensor 36) of a mobile terminal (e.g., mobile terminal 10) or other computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in hardware in a number of different ways. For example, the processor 70 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a vector processor, a graphics processing unit (GPU), a special-purpose computer chip, or other hardware implementations. As such, in some embodiments, the processor 70 may include one or more processing cores configured to perform independently. A multi-core processor may enable multiprocessing within a single physical package. Additionally or alternatively, the processor 70 may include one or more processors configured in tandem via a bus (e.g., an I2C (inter-integrated circuit) bus) to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or movement sensor) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

In an exemplary embodiment, the processor 70 may be embodied as, include or otherwise control a data pre-processor 80 and a state determiner 82. As such, in some embodiments, the processor 70 may be said to cause, direct or control the execution or occurrence of the various functions attributed to the data pre-processor 80 and the state determiner 82, respectively, as described herein. The data pre-processor 80 and the state determiner 82 may each be any means such as a device or circuitry operating in accordance with software or otherwise embodied in hardware or a combination of hardware and software.

The data pre-processor 80 may be configured to process sensor data received threat prior to the sensor data received being operated on by the state determiner 82. The state determiner 82 may be configured to determine an output relative to pattern recognition for a corresponding input. In some examples, the state determiner 82 may be configured to execute a pattern recognition algorithm as defined in greater detail below. As such, the state determiner 82 may be configured to execute a relatively small and compact program in the form of a finite state machine to determine whether specific conditions are met that may be interpreted as recognition of the performance of a gesture or other physical movement pattern that matches the movements associated with a program stored for recognition by the state determiner 82. The data pre-processor 80 and the state determiner 82 may each be embodied in any of various different ways. However, some example implementation features are provided in FIGS. 3 to 5 to show specific details for one, non-limiting example case.

Figure 3:
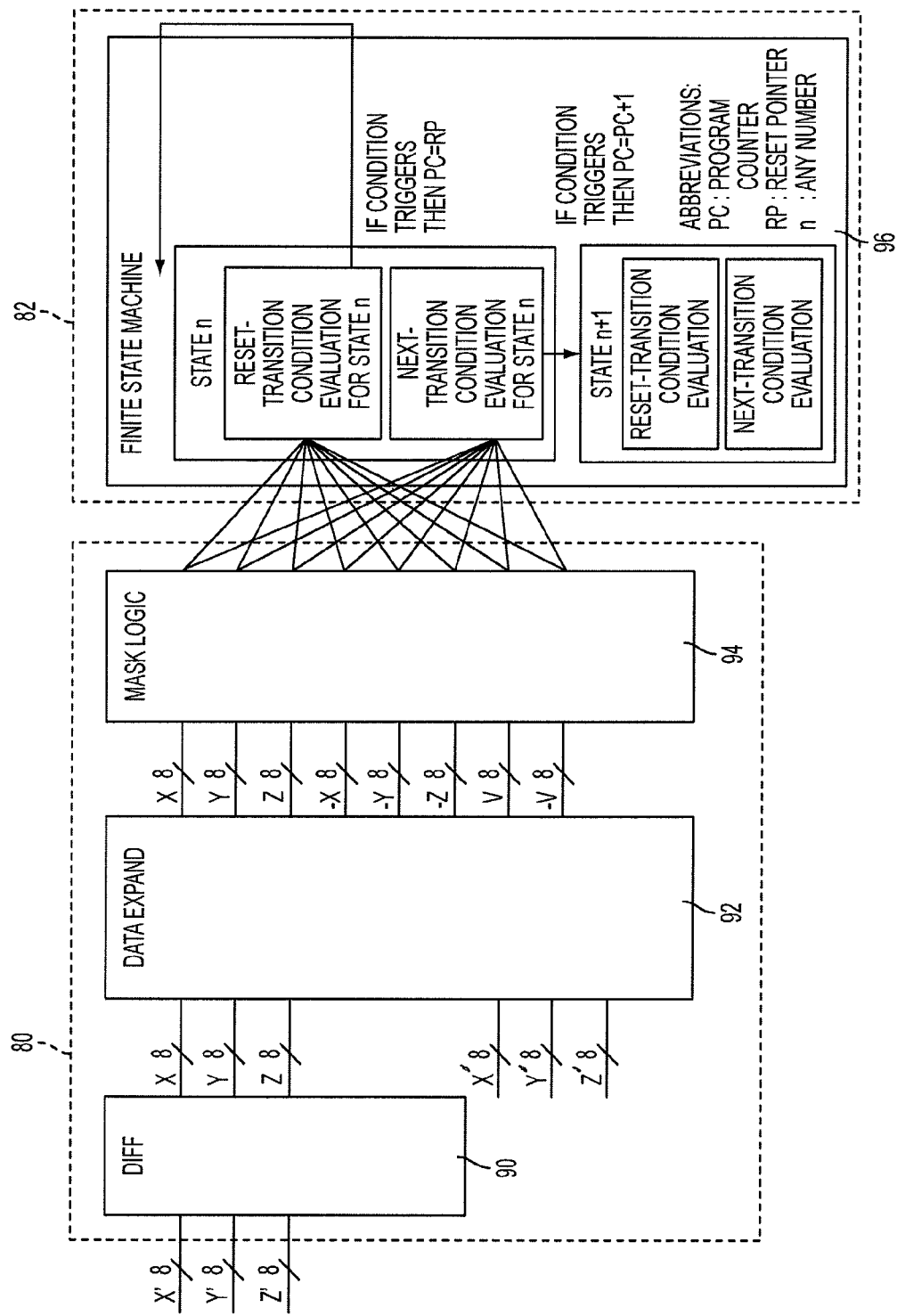
FIG. 3 illustrates a block diagram of a data pre-processor and a state determiner according to an example embodiment of the present invention.
Figure 4:
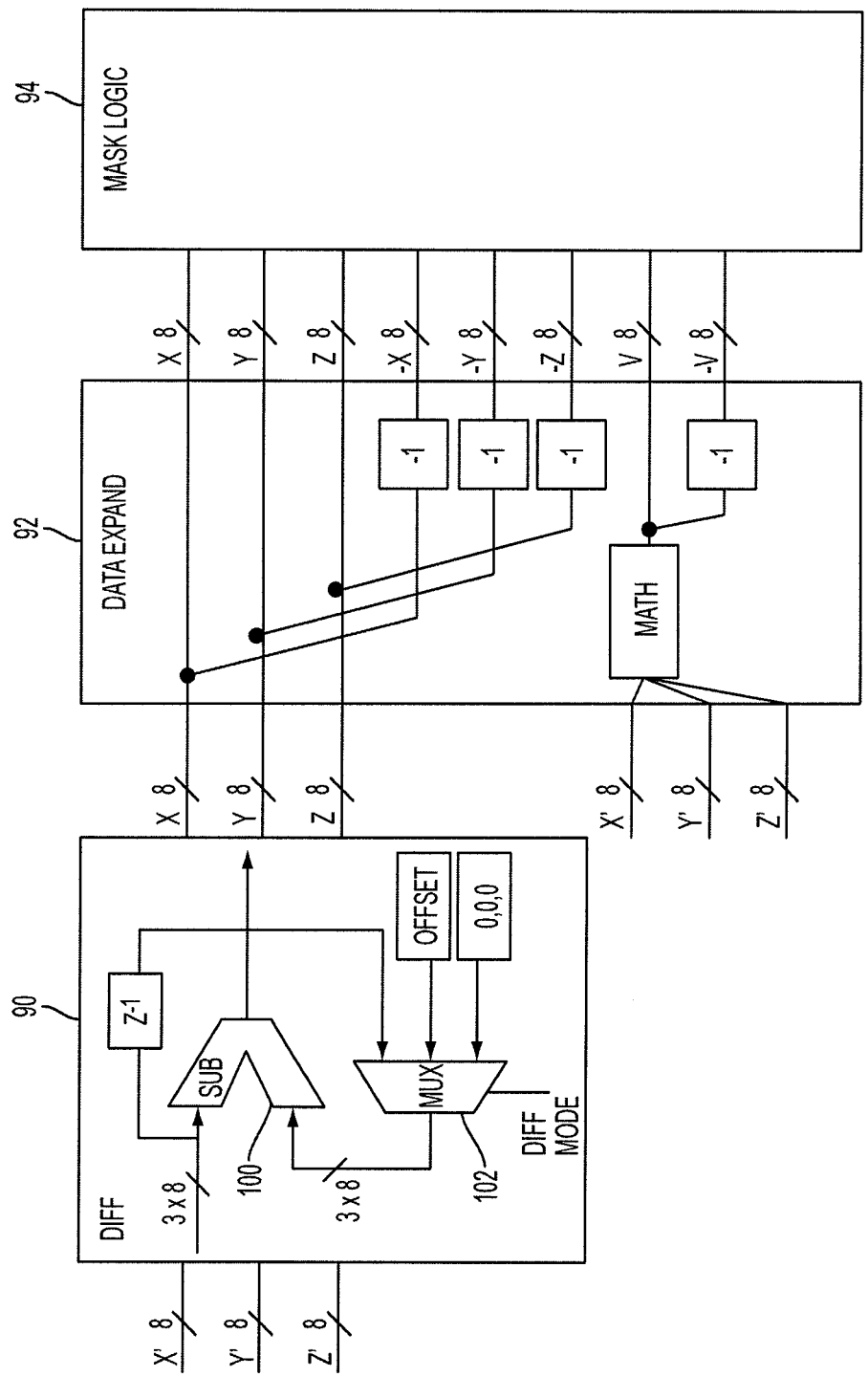
FIG. 4 illustrates a more detailed view of a block diagram of the data pre-processor according to an example embodiment of the present invention.
Figure 5:
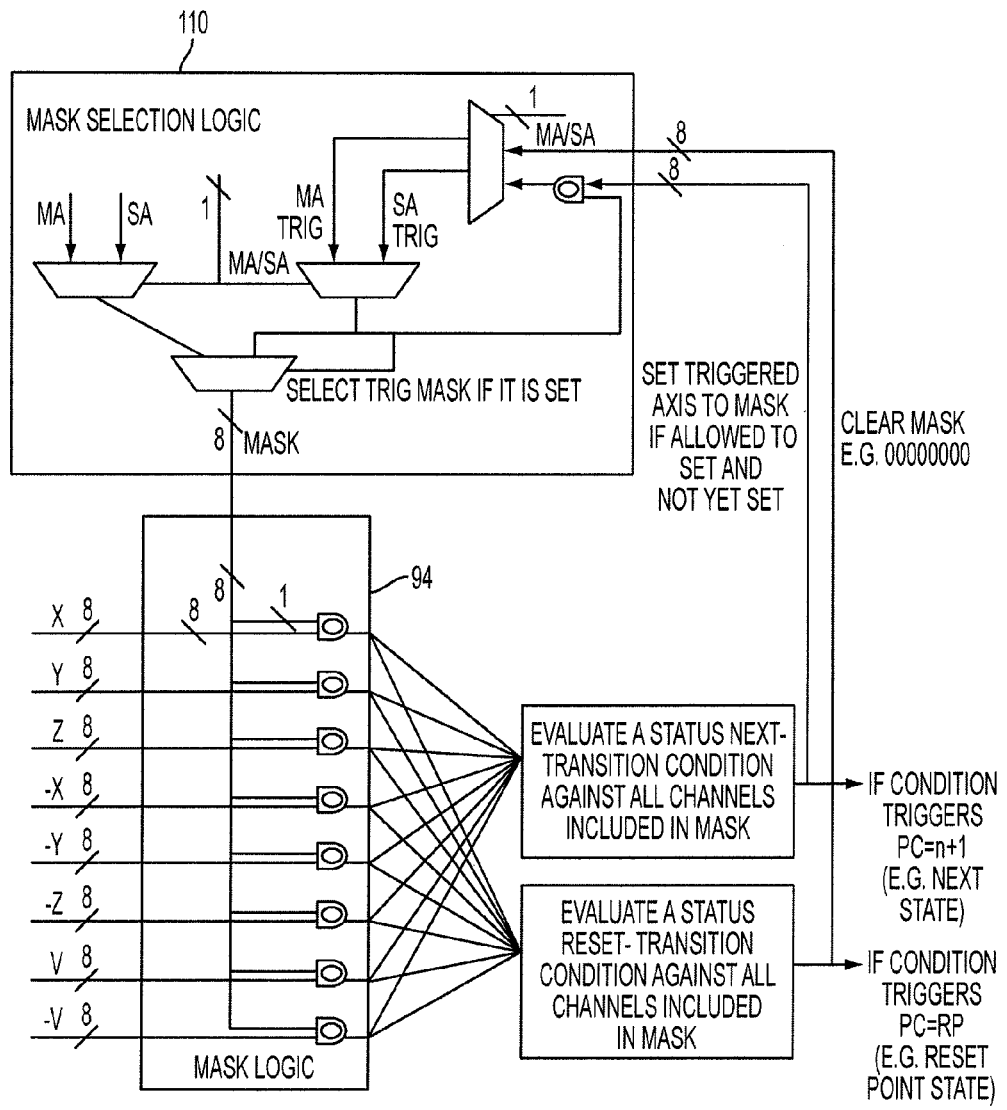
FIG. 5 illustrates a block diagram of mask logic within the data pre-processor according to an example embodiment of the present invention.

FIG. 3 illustrates a block diagram of the data pre-processor 80 and the state determiner 82 according to an example embodiment. FIG. 4 illustrates a more detailed view of a block diagram of the data pre-processor 80 according to an example embodiment. FIG. 5 illustrates a block diagram of mask logic within the data pre-processor 80 according to an example embodiment.

As shown in FIG. 3, the data pre-processor 80 may include a differentiator (Diff) 90, a data expander 92, and mask logic 94 and the state determiner 82 may include a finite state machine 96. As shown in FIG. 4, the Diff 90 may include a subtractor 100 and a multiplexer 102. The Diff 90 may receive sensor data corresponding to position information. In some cases, the position information may include data indicative of position in three dimensional space (e.g., relative to an x direction, a y direction and a z direction). As such, the position information may be received as x', y', z' data values. Upon receipt of the position information, the position information may be communicated to the subtractor 100 where one of three selectable subtraction operations may be performed based on the Diff mode selected. The Diff mode selection may determine the output of the multiplexor 102, which may provide a corresponding selected value to be subtracted from the position information. The options for subtraction based on the Diff mode selection may include subtraction of a constant value (e.g., 0, 0, 0) when, for example, there are no changes to the data, subtraction of "offset" values and subtraction of previous data values. Offset values may consume three bytes of memory and may be part of signal processing settings defined for operation of the apparatus 50. The previous data values may be data resulting from delta values resulting between two successive sensor data measurements. The previous data values may be retrieved from temporary memory (e.g., a portion of the memory device 76). Accordingly, each time a set of current values is determined, the current values may be stored in the temporary memory for future use as previous data values as new current values are received. An output of the subtractor 100 may be fed to the data expander 92.

The data expander 92 may be configured to receive the position information (e.g., x', y', z' data values) and subtracted data (e.g., x, y, z data values) as inputs. The subtracted values received (e.g., x, y, z data values) may be passed along to the mask logic 94. In an example embodiment, the data expander 92 may include one or more inverters to also pass along inverse data values (e.g., −x, −y, −z data values) that are the inverse of the subtracted values. In other words, the data expander 92 may be configured to receive the subtracted data and provide both the subtracted data and inverse subtracted data as an output to the mask logic 94. The position information (e.g., x', y', z' data values) that is received by the data expander 92 may be used to generate a pass result (v and −v) to the mask logic 94. The pass result may be determined as a value resulting from the application of a mathematical function (e.g., a proprietary equation) to the position information. Accordingly, the data expander 92 may be configured to pass a total of eight data values (e.g., x, y, z, v and −x, −y, −z, −v data values) defined as outcome values on to the mask logic 94.

The mask logic 94 may be configured to select what input data is to be used for pattern recognition in the state determiner 82. As such, the mask logic 94 may effectively define the specific values from among the outcome values received that are to be sent to a pattern recognition algorithm for processing. In other words, the mask logic 94 filters out data values that are not needed or otherwise are not to be used for a particular pattern recognition algorithm.

In an example embodiment, the apparatus 50 and/or the mobile terminal 10 may be configured according to settings (e.g., signal processing settings) defining masks to be applied by the mask logic 94. As such, mask logic block related settings may define filter parameters for incoming outcome values. In an example embodiment, the mask logic block related settings may include at least a primary mask (MA) and a secondary mask (SA). The primary mask and the secondary mask may each be, for example, the same number of bits as the data values received (e.g., eight bits). A mask selector (MASA) may be used to select which of one of either the primary mask or the secondary mask to apply to outcome values received at the mask logic 94. The mask selector may be a single bit in some examples.

In an example embodiment, additional masks may also be provided. For example, in one example embodiment, a mask logic selection block may include two additional masks (e.g., MAtrig and SAtrig), which may be set (e.g., based on MASA) and activated after a triggered next condition, if activation is enabled. The triggered masks (e.g., MAtrig and SAtrig) may then remain the enabled set of masks that are selectable via the mask selector for additional data received until a specific signal (e.g., a trigger clearance signal or a reset condition) is received. As such, for example, a "-trig" mask may be cleared after a triggered reset condition. The mask logic 94 may, in some embodiments, include or otherwise operate in connection with mask selection logic 110 as shown in FIG. 5. The mask selection logic 110 may provide the logical structures for selection of the mask to be applied (e.g., MA, SA, MAtrig, or SAtrig) based on the mask selector (e.g., MASA) and indications as to whether a trigger condition has been received as is further indicated according to the example of FIG. 5. In this regard, MASA selects between a primary mask (MA or MAtrig) and a secondary mask (SA or SAtrig) and the primary and secondary masks may be associated with either the original (MA or SA) or triggered (MAtrig or SAtrig) mask sets described above, based on whether a trigger condition has been received.

In some embodiments, the use of the mask logic 94 may enable filtration of certain directional related conditions to be processed while others may be ignored and never reach the state determiner 82. As such, the mask logic 94 may be used, for example, for signal direction detection and for configuring chip printed wire board (PWB) orientation. The selected mask may therefore define values that are to be fed to the state determiner 82. As such, the "filtered" data that is passed to the state determiner 82 may be either all of the eight data values (e.g., x, y, z, v and −x, −y, −z, −v data values) received at the mask logic 94 or some subset of those values.

The state determiner 82 may receive the filtered data provided by the mask logic 94 and operate on the filtered data via the finite state machine 96. In some embodiments, the settings of the apparatus 50 or the mobile terminal 10 (e.g., signal processor settings) may include settings or values that are applicable to the operation of the finite state machine 96. For example, the settings or values may include a program counter (PC) to hold information about the current state of the finite state machine 96 and/or a reset pointer (RP) to indicate the state number at which the finite state machine 96 changes its state (e.g., sets PC=RP) on a reset transition (e.g., when a reset condition occurs). In some cases, the RP may be zero by default, but may be changed using program commands. The size of each of the RP and the PC may be four bits. Since both the PC and the RP are four bits in one example, both values may be encoded within a single byte of memory while representing a maximum of sixteen states of the finite state machine 96.

In some embodiments, the settings or values may include threshold and/or timer settings that are related to transition conditions. For example, the settings may define threshold values that, if met, may trigger a transition condition or state change. The values may, in some cases, be required to be present for a corresponding threshold length of time in order to be considered, and the timer settings may define such threshold lengths of time in connection with their respective values or threshold values. In one embodiment, examples of names or logical meanings of some parameters that may be defined and their corresponding sizes may include: threshold 1 (8 bits), threshold 2 (8 bits), timer 1 (16 bits), timer 2 (16 bits), timer 3 (8 bits), and timer 4 (8 bits). Each state number of the finite state machine 96 may have one byte of memory reserved for the corresponding state. The corresponding byte of memory for each state may encode both reset- and next-transition conditions for the corresponding state from the respective memory address. As such, each state may have two possible transitions therefrom including a transition to the next state or a transition to a reset state. The reset state may be the initial state by default, but may be changed in some cases using a set reset point (SRP) command as discussed below.

In some examples, there may be two types of transition conditions including timer based transitions and threshold based transitions. Each state may have timer and/or threshold conditions associated therewith (e.g., two conditions per state including one next condition and one reset condition, one of which may be NOP (no operation)). As indicated above, some timer based transition conditions may trigger when an amount of time consumed in a current state elapses. Threshold based transition conditions may trigger when a threshold condition matches input data (e.g., when the threshold is met). As an example, if input data is "x=10, y=0" (e.g., indicating that all other values have been filtered out by the mask logic 94) and threshold 1 is set to 5 with a transition condition being "greater than threshold 1", the condition trigger may be set because the value of x is greater than 5. In case of a next transition condition, the triggered mask may be set (although other embodiments enable the triggered mask not to be set so that the original mask is used) so that only x data values will remain for evaluation in next states (until a reset condition triggers or until the final state is reached). When a next transition triggers, the PC will increment by 1 each time a transition is encountered until the final state is reached. When the final state of the finite state machine 96 is encountered, the corresponding pattern may be interpreted to be detected and the apparatus 50 may send a signal (e.g., an interrupt signal over an I2C bus) to indicate that a signal matching the corresponding pattern has been detected. In some cases, signals may be sent during the middle of execution (e.g., using the OUTC and OUTW commands listed below). Careful selection of values for the transitions may enable designers to have a good expression power for describing signal patterns that are to be detected.

Status information may include the value of PC, RP, timer value and triggered mask information. When a reset transition triggers, PC may be set to equal RP and the triggered mask may be cleared. Data is therefore evaluated only against transition conditions of a current state (e.g., a state pointed to by PC). Each state only has two transition conditions (one of which may be NOP for no operation).

FIG. 6, which includes FIGS. 6A, 6B and 6C, illustrates an example of detection signals being evaluated using the finite state machine 96. In this regard, FIG. 6 illustrates an example in which a signal is received that triggers a next-transition condition and causes a transition to a next state. The example graphs of FIG. 6A show a received pulse compared to various parameters as prescribed by each of various different states of the finite state machine 96. FIG. 6B shows the corresponding states of the finite state machine 96 relative to the parametric measurements that determine whether a particular pattern (e.g., of movement of the mobile terminal 10 in a particular direction) is met. FIG. 6C illustrates example graphs to show failure to meet conditions needed to achieve transitions.

FIG. 6 therefore shows a pattern detection operation requiring a signal that must reach a threshold value for at least a minimum time and subside to below the threshold value within a maximum time period in order to cause a detection. In this regard, as shown in graph 200, a signal may be received with a value that exceeds a threshold based transition value (Threshold TH1). The finite state machine 96 may be in state 1 awaiting a pulse having a value greater than TH1 at operation 220 and, in response to receipt of a pulse like the one shown in graph 200, cause a transition to state 2. If the signal received never reaches TH1, as shown in graph 270 of FIG. 6C, no transition to state occurs.

If the transition to state 2 occurs, a timer based condition may be applied as shown at operation 222 of FIG. 6B. The timer based condition may check to see if the pulse received has a minimum length. In other words, the timer based condition may check to see if the pulse maintains a value greater than TH1 for at least the time defined by the expiry of a first timer (T1). As shown in graph 202, the value of the pulse stays above TH1 until the first timer expires so the finite state machine 96 may transition to state 3. However, if the condition of operation 222 was not met (e.g., if the value of the pulse went below TH1 prior to expiry of the first timer as shown in graph 272 of FIG. 6C), the finite state machine 96 would have transitioned back to the initial state (e.g., state 1 and corresponding operation 220).

If the transition to state 3 occurs, a check may be conducted to determine whether the pulse exceeds a maximum length at operation 224 of FIG. 6B. At operation 224, the check as to whether the maximum length of the pulse is exceeded may be conducted by ensuring that the signal value decreased below threshold TH1 prior to the expiry of a second timer (T2). Graph 204 indicates an example in which the pulse is below TH1 prior to the expiry of the second timer. Accordingly, the finite state machine 96 may proceed to the end state at operation 226. However, if the condition of operation 224 was not met (e.g., if the value of the pulse was above TH1 after expiry of the second timer as shown in graph 274 of FIG. 6C), the finite state machine 96 would have transitioned back to the initial state (e.g., state 1 and corresponding operation 220).

FIG. 7 shows example state chart of a signal detection algorithm corresponding to the example described in FIG. 6. In FIG. 7, the numbers of the states of the finite state machine are listed in the far left column. In the adjacent column, the values that cause reset conditions to be met in each respective state are listed. To the right of the reset column, a listing of the conditions required to advance from the corresponding state into a next state are listed. Information about each respective state is then listed in the far right column. FIG. 7 therefore converts the signal detection algorithm of FIG. 6 to mnemonic codes of a domain specific processor. FIG. 8 illustrates an example of the conversion of the mnemonic codes of FIG. 7 into machine code of a domain specific processor according to an example embodiment. The table below illustrates example transition conditions. The table provided below provides sixteen transition conditions so that both transitions of a single state (e.g., the next and reset conditions) can be encoded in one byte. Four bits may be provided for the next condition and four bits may be provided for the reset condition. In some embodiments, size limitations may be implemented to provide room for only sixteen conditions. Accordingly, careful selection of the transition conditions may provide the best possible expression for algorithms.

| | | |
|---|---|---|
| NOP | = 0x0 | # No execution/condition on current sample period |
| TI1 | = 0x1 | # counter (TCx) validation for timer1 (TIMx_1) initial value |
| TI2 | = 0x2 | # counter (TCx) validation for timer2 (TIMx_2) initial value |
| TI3 | = 0x3 | # counter (TCx) validation for timer3 (TIMx_3) initial value |
| TI4 | = 0x4 | # counter (TCx) validation for timer4 (TIMx_4) initial value |
| GNTH1 | = 0x5 | # Any/triggered axis value > than Threshold1 (THRS1_x) parameter |
| GNTH2 | = 0x6 | # Any/triggered axis value > than Threshold2 (THRS2_x) parameter |
| LNTH1 | = 0x7 | # Any/triggered axis value <= than Threshold1 (THRS1_x) parameter |
| LNTH2 | = 0x8 | # Any/triggered axis value <= than Threshold2 (THRS2_x) parameter |
| GTTH1 | = 0x9 | # original mask axis value > than Threshold1 (THRS1_x) parameter |
| LLTH2 | = 0xA | # All/triggered axis value <= than Threshold2 (THRS2_x) parameter # zero-g |
| GRTH1 | = 0xB | # Any/triggered axis value > than reversed Threshold1 (THRS1_x) parameter |
| LRTH1 | = 0xC | # Any/triggered axis value <= than reversed Threshold1 (THRS1_x) parameter |
| GRTH2 | = 0xD | # Any/triggered axis value > than reversed Threshold2 (THRS1_x) parameter |
| LRTH2 | = 0xE | # Any/triggered axis value <= than reversed Threshold2 (THRS1_x) parameter |
| NZERO | = 0xF | # Any/triggered axis value crossed zero |

On top of the next and reset transition condition commands, other commands may be provided for changing signal processing settings. These commands may be stored in the same memory space and therefore may reduce the number of available finite state machine states for a pattern recognition program. The commands may be encoded by using next and reset transition conditions that are not otherwise meaningful for use. Accordingly, at least 28 commands may be presented as indicated in the following list.

| | | |
|---|---|---|
| STOP | = 0x00 | # Stop execution and wait new start from beginning |
| CONT | = 0x11 | # Loop continues from the beginning |
| JMP | = 0x22 | # 1st and 2nd conditions jump command |

-continued

| | | |
|---|---|---|
| SRP | = 0x33 | # Sets Reset Point RPx to defined address (to this address+1) |
| CRP | = 0x44 | # Sets Reset Point RPx to 0000b address |
| SETP | = 0x55 | # Set parameter to address (any register based address) |
| SETS1 | = 0x66 | # Changes settings byte 1 value (SETTx) (Needed when more that 2 bit are modified) |
| STHR1 | = 0x77 | # Change threshold 1 byte value /THRS1_y |
| OUTC | = 0x88 | # Outputs source information and continue |
| OUTW | = 0x99 | # Outputs source information and wait latch reset |
| STHR2 | = 0xAA | # Change threshold 2 byte value /THRS2_y |
| DEC | = 0xBB | # Decreases long counter (LC) and validite counter (LC) |
| SISW | = 0xCC | # Swaps (MASAx) pointed TAMxAx register sign mask to opposite sign for axis |
| REL | = 0xDD | # Releases temporary triggrer source intormation TAMxAx information to default values |
| STHR3 | = 0xEE | # Change threshold 3 byte value /THRS3 |
| SSYNC | = 0xFF | # serial synch, toggle execution between state machines |
| SABS0 | = 0x12 | # TI1 | TI2 set setting abs0 |
| SABS1 | = 0x13 | # TI1 | TI3 set setting abs1 |
| SELMA | = 0x14 | # TI3 | TI4 select MA mask (set MASA = 0) |
| SRADI0 | = 0x21 | # TI1 | TI4 set setting diff0 |
| SRADI1 | = 0x23 | # TI2 | TI1 set setting diff1 |
| SELSA | = 0x24 | # TI4 | TI1 select SA mask (set MASA = 1) |
| SCS0 | = 0x31 | # TI2 | TI3 set setting constant shift 0 |
| SCS1 | = 0x32 | # TI2 | TI4 set setting constant shift 1 |
| SRTAM0 | = 0x34 | # TI3 | TI1 normal operation of tmp mask |
| SRTAM1 | = 0x43 | # TI3 | TI2 after next transition, tmp mask will be always set to 0 |
| STIM3 | = 0x41 | # TI4 | TI2 Change timer 3 byte value /TIM3_y |
| STIM4 | = 0x42 | # TI4 | TI3 Change timer 4 byte value /TIM4_y |

Each command may reserve one byte of memory. Additionally, some commands may reserve one or two bytes of memory for storage of corresponding parameters. Of note, the JMP command of some embodiments may take up three bytes including the JMP command and two conditions and two jump addresses. The SRP/CRP command may set reset point to address PC+1. CRP may set reset point to state 0. The STOP command may send an interrupt and stop execution. The CONT command may send an interrupt and continue from state 0. OUTW may send an interrupt and wait for the host while the OUTS command may send an interrupt and continue to the next state. SELMA may select an MA mask and SELSA may select an SA mask. SELMA may reset and SELSA may set the MASA bit. SRTAM0 may provide for normal operation of a triggered mask. SRTAM1 may keep a triggered mask always cleared such that the original mask (e.g., MA or SA) is always used instead of triggered masks (MAtrig or SAtrig). REL may clear a currently used triggered mask that has been selected by MASA.

In some embodiments, extra logic may be provided for peak detection in order to accurately determine parameters (e.g. such as peaks) for direction detection for a gesture. For example, a triggered mask may be set by default based on the axis and direction that meets a first threshold condition. When peak detection is active, a triggered mask may be set based on the axis and direction at which the highest value has been detected in between the first and second threshold conditions. The triggered mask may be updated every time if higher values come from some other axis or direction. In this example, a second threshold condition is evaluated normally against the triggered mask. Accordingly, it may be possible to detect direction from a signal in a more robust way. In an example case, memory for a particular program code defining a detection pattern may take no more than 16 bytes and memory for signal processing settings may take no more than 12 bytes. 4 additional bytes may be reserved for finite state machine program execution and additional output information. As such, a single program may be provided with a total memory footprint of 32 bytes of memory, which may be considered to be a remarkably small footprint for still providing a robust detection capability. Accordingly, good pattern detection may be accomplished with low cost and low power consumption.

Some example embodiments may enable low cost solutions with low power consumption to be provided for enabling processing of sensor data in a more efficient manner than the use of a main processor or dedicated microprocessor to achieve the same effect. As such, processing capabilities may be enabled more frequently or even continuously while still providing for processing with relatively less cost and power consumption. A number of different gestures may be detected such as, for example, a double tap gesture, a double shake gesture (e.g., in one direction or multiple directions), a single shake gesture, a double turn gesture, orientation determination (e.g., landscape or portrait), start and stop detection for pedestrian movement, step counters, and/or the like. Example embodiments may therefore be employed to provide evaluation of gesture inputs and trigger corresponding functionalities such as providing power saving and/or wake up functions, step counting, and/or other functionalities that may be triggered based on movement detected by a sensor.

In some embodiments, the pattern recognition algorithms may be pre-loaded or otherwise pre-existing (e.g., set at the factory or by developers). However, the pattern recognition algorithms may be loaded in chip on a run-time basis over an I2C digital bus in some embodiments. Thus, for example, a third party or even a user may define pattern recognition algorithms in some embodiments.

FIG. 9 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or other device and executed by a processor in the mobile terminal or other device. As will be appreciated, any such computer program instructions may be loaded onto a computer or other programmable apparatus, e.g., hardware, to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 9, may include receiving an indication of sensor data descriptive of movement of a user terminal at operation 300 and providing for expansion of the sensor data in a predetermined manner to define outcome values at operation 310. The method may further include applying a logical mask to the outcome values to generate selected outcome values for provision to a finite state machine at operation 320 and utilizing a pattern recognition algorithm associated with the finite state machine to determine whether the sensor data corresponds to a pattern identified by proceeding through defined transitions to a final state of the finite state machine at operation 330.

In some embodiments, certain ones of the operations above may be modified or further amplified as described below. Moreover, in some embodiments additional optional operations may also be included. It should be appreciated that each of the modifications, optional additions or amplifications described herein may be included with operations 300 to 330 above either alone or in combination with any others among the features described herein. As such, each of the optional modifications is combinable with operations 300, 310, 320 and 330 either alone or with one, more than one, or all of the other optional operations in any combination. In an example embodiment, receiving the indication of the sensor data may include receiving data defining movement information of the user terminal in one or multiple dimensions, and providing for expansion of the sensor data may include applying a mathematical function to the movement information to generate outcome data formatted in a predefined manner. In some embodiments, applying the logical mask may include applying a mask selected based on mask selection logic. Moreover, applying the mask selected based on the mask selection logic may include incorporating a mask selector input and data indicative of a trigger condition to determine whether to apply a primary mask or secondary mask for either a triggered condition or an un-triggered condition. In an example embodiment, utilizing the pattern recognition algorithm may include utilizing a program defining the pattern recognition algorithm. The program may be stored in memory and executed by a processor and both the memory and the processor may share a chip with a sensor providing the sensor data or otherwise be embodied with hardware providing the sensor data. In some embodiments, utilizing the pattern recognition algorithm may include utilizing a program stored in no more than sixteen bytes of memory with sixteen bytes also reserved for settings (12 bytes) and output (4 bytes). The output may include two bytes for a timer counter and one byte for PC and RP values. One byte may also be provided for content of the currently active triggered mask (MAtrig or SAtrig). As seen from FIG. 3, the output of data expanded is eight data "channels" and thus eight bits may be used to mask eight channels. Each mask may therefore be stored in a single byte. In an example embodiment, utilizing the pattern recognition algorithm may include utilizing an algorithm defined in the finite state machine based on transitions including timer based transitions or threshold based transitions. Additionally or alternatively, utilizing the pattern recognition algorithm may include utilizing an algorithm defined in the finite state machine in which each state has only two possible transitions including a next state and a reset state. In some examples, utilizing the pattern recognition algorithm may include utilizing an algorithm defined by a manufacturer (e.g., sensor manufacturer or terminal manufacturer) or a user.

In an example embodiment, an apparatus for performing the method of FIG. 9 above may comprise a processor (e.g., the processor 70) configured to perform some or each of the operations (300-330) described above. The processor may, for example, be configured to perform the operations (300-330) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-330 may comprise, for example, respective ones of the data pre-processor 80 and the state determiner 82. Additionally or alternatively, at least by virtue of the fact that the processor 70 may be configured to control or even be embodied as the data pre-processor 80 and the state determiner 82, the processor 70 and/or a device or circuitry for executing instructions or executing an algorithm for processing information as described above may also form example means for performing operations 300-330.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of sensor data descriptive of movement of a user terminal;
   providing for expansion of the sensor data in a predetermined manner to define outcome values;
   applying a logical mask to the outcome values to generate selected outcome values for provision to a finite state machine; and
   utilizing a pattern recognition algorithm associated with the finite state machine to determine whether the sensor data corresponds to a pattern identified by proceeding through defined transitions to a final state of the finite state machine.

2. The method of claim 1, wherein receiving the indication of the sensor data comprises receiving data defining movement information of the user terminal in one or multiple dimensions and wherein providing for expansion of the sensor data comprises applying a mathematical function to the movement information to generate outcome data formatted in a predefined manner.

3. The method of claim 1, wherein applying the logical mask comprises applying a mask selected based on mask selection logic.

4. The method of claim 3, wherein applying the mask selected based on the mask selection logic comprises incorporating a mask selector input and data indicative of a trigger condition to determine whether to apply a primary mask or secondary mask for either a triggered condition or an untriggered condition.

5. The method of claim 1, wherein utilizing the pattern recognition algorithm comprises utilizing a program defining the pattern recognition algorithm, the program being stored in memory and executed by a processor, the memory and the processor sharing a chip with a sensor providing the sensor data.

6. The method of claim 1, wherein utilizing the pattern recognition algorithm comprises utilizing a program defining the pattern recognition algorithm, the program being stored in memory and executed by a processor, the memory and the processor being embodied with hardware providing the sensor data.

7. The method of claim 1, wherein utilizing the pattern recognition algorithm comprises utilizing a program stored in no more than sixteen bytes of memory with sixteen bytes also reserved for settings and output.

8. The method of claim 1, wherein utilizing the pattern recognition algorithm comprises utilizing an algorithm defined in the finite state machine based on transitions including timer based transitions or threshold based transitions.

9. The method of claim 1, wherein utilizing the pattern recognition algorithm comprises utilizing an algorithm defined in the finite state machine in which each state has only two possible transitions including a next state and a reset state.

10. The method of claim 1, wherein utilizing the pattern recognition algorithm comprises utilizing an algorithm defined by a manufacturer or a user.

11. An apparatus comprising at least one processor and at least one memory including computer program code, the at least one memory and the computer program code configured to, with the at least one processor, cause the apparatus to at least:
receive an indication of sensor data descriptive of movement of the apparatus;
provide for expansion of the sensor data in a predetermined manner to define outcome values;
apply a logical mask to the outcome values to generate selected outcome values for provision to a finite state machine; and
utilize a pattern recognition algorithm associated with the finite state machine to determine whether the sensor data corresponds to a pattern identified by proceeding through defined transitions to a final state of the finite state machine.

12. The apparatus of claim 11, wherein the at least one memory and computer program code are further configured to, with the at least one processor, cause the apparatus to receive the indication of the sensor data by receiving data defining movement information of the apparatus in one or multiple dimensions and wherein expand the sensor data by applying a mathematical function to the movement information to generate outcome data formatted in a predefined manner.

13. The apparatus of claim 11, wherein the at least one memory and computer program code are further configured to, with the at least one processor, cause the apparatus to apply the logical mask by applying a mask selected based on mask selection logic.

14. The apparatus of claim 13, wherein the at least one memory and computer program code are further configured to, with the at least one processor, cause the apparatus to apply the mask selected based on the mask selection logic by incorporating a mask selector input and data indicative of a trigger condition to determine whether to apply a primary mask or secondary mask for either a triggered condition or an untriggered condition.

15. The apparatus of claim 11, wherein the at least one memory and computer program code are further configured to, with the at least one processor, cause the apparatus to utilize the pattern recognition algorithm by utilizing a program defining the pattern recognition algorithm, the program being stored in memory and executed by a processor, the memory and the processor sharing a chip with a sensor providing the sensor data or being embodied with hardware providing the sensor data.

16. The apparatus of claim 11, wherein the at least one memory and computer program code are further configured to, with the at least one processor, cause the apparatus to utilize the pattern recognition algorithm by utilizing a program stored in no more than sixteen bytes of memory with sixteen bytes also reserved for settings and output.

17. The apparatus of claim 11, wherein the at least one memory and computer program code are further configured to, with the at least one processor, cause the apparatus to utilize the pattern recognition algorithm by utilizing an algorithm defined in the finite state machine based on transitions including timer based transitions or threshold based transitions.

18. The apparatus of claim 11, wherein the at least one memory and computer program code are further configured to, with the at least one processor, cause the apparatus to utilize the pattern recognition algorithm by utilizing an algorithm defined in the finite state machine in which each state has only two possible transitions including a next state and a reset state.

19. The apparatus of claim 11, wherein the at least one memory and computer program code are further configured to, with the at least one processor, cause the apparatus to utilize the pattern recognition algorithm comprises utilizing an algorithm defined by a manufacturer or a user.

20. A computer program product comprising at least one non-transitory computer-readable storage medium having computer-executable program code instructions stored therein, the computer-executable program code instructions comprising program code instructions to:
receive an indication of sensor data descriptive of movement of a user terminal;
provide for expansion of the sensor data in a predetermined manner to define outcome values;
apply a logical mask to the outcome values to generate selected outcome values for provision to a finite state machine; and
utilize a pattern recognition algorithm associated with the finite state machine to determine whether the sensor data corresponds to a pattern identified by proceeding through defined transitions to a final state of the finite state machine.

* * * * *